United States Patent
Wang et al.

(10) Patent No.: US 10,820,294 B2
(45) Date of Patent: Oct. 27, 2020

(54) PREDICTING AVAILABLE ACCESS POINTS

(71) Applicant: Hewlett Packard Enterprise Development LP, Houston, TX (US)

(72) Inventors: Shuai Wang, Beijing (CN); Xiaofeng Yu, Beijing (CN); Jun Qing Xie, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 215 days.

(21) Appl. No.: 15/572,064

(22) PCT Filed: Mar. 9, 2015

(86) PCT No.: PCT/CN2015/073874
§ 371 (c)(1),
(2) Date: Nov. 6, 2017

(87) PCT Pub. No.: WO2016/141527
PCT Pub. Date: Sep. 15, 2016

(65) Prior Publication Data
US 2019/0191407 A1 Jun. 20, 2019

(51) Int. Cl.
*H04W 24/00* (2009.01)
*H04W 64/00* (2009.01)
(Continued)

(52) U.S. Cl.
CPC ......... *H04W 64/003* (2013.01); *G01S 5/0252* (2013.01); *H04B 17/318* (2015.01);
(Continued)

(58) Field of Classification Search
CPC ..... H04W 48/16; H04W 48/20; H04W 64/00; H04W 12/06; H04W 24/02; H04W 24/08;
(Continued)

(56) References Cited

U.S. PATENT DOCUMENTS

| 7,945,271 B1 | 5/2011 | Kaemarungsi |
| 8,050,243 B2 | 11/2011 | Ostergren |

(Continued)

FOREIGN PATENT DOCUMENTS

| CN | 103150628 A | 6/2013 |
| CN | 104093203 A | 10/2014 |

(Continued)

OTHER PUBLICATIONS

Yetim et al, "Dynamic Adaptive Techniques for Learning Application Delay Tolerance for Mobile Data Offloading", IEEE Conference on Computer Communications (INFOCOM), 2015, 9 pages.

(Continued)

*Primary Examiner* — Joseph Arevalo
(74) *Attorney, Agent, or Firm* — Hewlett Packard Enterprise Patent Department

(57) ABSTRACT

Examples relate to predicting available access points. In one example, a computing device may: obtain a set of training fingerprints, each training fingerprint specifying, for a client device, i) a set of access points, and ii) cellular signal strength measurements for each cellular tower in a set of cellular towers; generate a plurality of classes based on the set of training fingerprints, each class specifying at least one access point, the access points of each class corresponding to the set of access points specified by at least one training fingerprint, and each combination being different from combinations specified by each other class in the plurality of classes; and train a predictive model to receive, as input, an input fingerprint specifying a cellular signal strength measurement for each cellular tower in a set of input cellular towers and produce, as output, at least one of the plurality of classes.

9 Claims, 5 Drawing Sheets

(51) Int. Cl.

| | |
|---|---|
| *G01S 5/02* | (2010.01) |
| *H04B 17/318* | (2015.01) |
| *H04W 36/00* | (2009.01) |
| *H04W 8/00* | (2009.01) |
| *H04W 8/02* | (2009.01) |
| *H04W 16/18* | (2009.01) |
| *H04W 24/10* | (2009.01) |
| *H04W 48/16* | (2009.01) |

(52) U.S. Cl.
CPC ............ *H04W 8/005* (2013.01); *H04W 8/02* (2013.01); *H04W 16/18* (2013.01); *H04W 24/10* (2013.01); *H04W 36/0088* (2013.01); *H04W 36/00835* (2018.08); *H04W 48/16* (2013.01)

(58) Field of Classification Search
CPC . H04W 24/10; H04W 28/0263; H04W 36/30; H04W 48/18; H04W 4/02; H04W 4/021; H04W 4/08; H04W 64/003; H04W 64/006; H04W 72/06; H04W 72/085; H04W 72/121; H04W 8/005; H04W 8/18
USPC ... 455/456.1, 457, 67.11, 456.5, 456.3, 41.1, 455/452.173
See application file for complete search history.

(56) References Cited

U.S. PATENT DOCUMENTS

| | | | |
|---|---|---|---|
| 8,570,993 B2 | 10/2013 | Austin et al. | |
| 8,824,315 B2 | 9/2014 | Kokkinen et al. | |
| 9,210,682 B2 | 12/2015 | Garin et al. | |
| 9,810,764 B2 * | 11/2017 | Shaw | H04W 64/006 |
| 9,913,139 B2 * | 3/2018 | Gross | H04W 12/06 |
| 10,231,138 B2 * | 3/2019 | Kerpez | H04W 24/02 |
| 2004/0203873 A1 | 10/2004 | Gray | |
| 2007/0019586 A1 | 1/2007 | Nanda et al. | |
| 2007/0180320 A1 | 8/2007 | Poyhonen et al. | |
| 2009/0310585 A1 | 12/2009 | Alizadeh-Shabdiz | |
| 2011/0058478 A1 * | 3/2011 | Krym | H04W 28/08 370/237 |
| 2011/0286437 A1 | 11/2011 | Austin et al. | |
| 2012/0297055 A9 | 11/2012 | Raleigh | |
| 2012/0316964 A1 | 12/2012 | Roumeliotis et al. | |
| 2013/0018826 A1 * | 1/2013 | Sundararajan | H04L 12/6418 706/12 |
| 2013/0072216 A1 | 3/2013 | Ledlie | |
| 2013/0095846 A1 * | 4/2013 | Brisebois | H04W 16/28 455/456.1 |
| 2013/0159722 A1 * | 6/2013 | Goergen | H04N 1/32144 713/176 |
| 2014/0019262 A1 * | 1/2014 | Reitsma | G06Q 30/02 705/14.71 |
| 2014/0105003 A1 | 4/2014 | Austin et al. | |
| 2014/0129560 A1 * | 5/2014 | Grokop | G06N 5/043 707/737 |
| 2014/0274069 A1 | 9/2014 | Scheim et al. | |
| 2015/0103806 A1 | 4/2015 | Kuusilinna et al. | |
| 2015/0163851 A1 * | 6/2015 | Babaei | H04W 4/021 370/329 |
| 2016/0166208 A1 * | 6/2016 | Girouard | A61B 5/7264 600/546 |
| 2017/0142650 A1 * | 5/2017 | Wang | H04W 48/20 |
| 2017/0238205 A1 * | 8/2017 | Syrjarinne | H04W 4/02 455/456.6 |
| 2017/0336494 A1 * | 11/2017 | Han | G01S 11/06 |
| 2017/0343638 A1 * | 11/2017 | Jampani | G01S 5/0252 |
| 2018/0152849 A1 | 5/2018 | Wang et al. | |
| 2018/0160364 A1 * | 6/2018 | Wang | H04W 48/16 |
| 2018/0352473 A1 * | 12/2018 | Gunasekara | H04W 48/16 |
| 2018/0368046 A1 * | 12/2018 | Zhang | H04W 16/32 |

FOREIGN PATENT DOCUMENTS

| | | | |
|---|---|---|---|
| CN | 104302000 A | 1/2015 | |
| EP | 2224769 A1 | 9/2010 | |
| EP | 2224771 A1 | 9/2010 | |
| EP | 2785079 A1 | 10/2014 | |
| KR | 10-1489665 B1 | 2/2015 | |
| WO | WO-2013175048 A1 * | 11/2013 | ............ H04W 64/00 |
| WO | WO-2014/72090 A2 | 10/2014 | |
| WO | WO-2014172090 A2 * | 10/2014 | ............ H04W 4/023 |

OTHER PUBLICATIONS

Wen, Bin, "An Improved Method Used in Indoor Location Based on Signal Similarity Analysis and Adaptive Algorithms Selection", Wireless Communications, Networking and Mobile Computing, Sep. 2012. 6 pages.

Tsoumakas et al., "Random k-labelsets: An ensemble method for multilabel classification", In: Proceedings of the 18th European Conference on Machine Learning (ECML-2007), Warsaw, Poland, 2007, pp. 406-417.

Tsoumakas et al., "Multi-label classification: an overview", International Journal of Data Warehousing & Mining, vol. 3, No. 3, pp. 1-13.

Tsoumakas et al., "Mining Multi-label Data", Data Mining and Knowledge Discovery Handbook, O. Maimon, L. Rokach (Ed.), Springer, 2nd edition, 2010, pp. 667-685.

Tian et al., "Practical Indoor Localization using Ambient RF", IEEE International Instrumentation and Measurement Technology Conference (I2MTC), May 2013, United States, pp. 1125-1129.

Thrun et al., "Robust Monte Carlo localization for Mobile Robots", Articial Intelligence, vol. 128, pp. 99-141.

Stites et al., "User Privacy on iOS and OS X", Core OS, WWDC14, Session 715, 2014, 109 pages.

Schwaighofer et al., "GPPS: A Gaussian process positioning system for cellular networks", In Advances in Neural Information Processing Systems 16. MIT Press, 2003, pp. 579-586.

Rahmati et al., "Context-for-Wireless: Context-Sensitive Energy-Efficient Wireless Data Transfer", in MobiSys'07, Proceedings of the 5th international conference on Mobile systems, applications and services, 2007, pp. 165-178.

Quinlan, J. R., "C4.5: Programs for Machine Learning. Morgan Kaufmann Publishers", 1993, pp. 1-6.

Ouyang et al., "Indoor Localization via Discriminatively Regularized Least Square Classification", International Journal of Wireless Information Networks, Jun. 2011, vol. 18, Issue 2, pp. 57-72.

Oussar et al., "Indoor localization based on cellular telephony RSSI fingerprints containing very large Numbers of carriers", EURASIP Journal on Wireless Communications and Networking, vol. 81, 2011, 14 pages.

Office Action received for European Patent Application No. 15884208.8, dated Oct. 10, 2018, 4 pages.

Li et al., "Outdoor Location Estimation in Changeable Environments", IEEE Communication Letters, vol. 17, No. 11, Nov. 2013, pp. 2072-2075.

Li et al., "Location estimation in large indoor multi-floor buildings using hybrid networks", In Wireless Communications and Networking Conference (WCNC), 2013 IEEE, pp. 2137-2142.

International Preliminary Report on Patentability received for PCT Patent Application No. PCT/CN2015/073874, dated Sep. 21, 2017, 6 pages.

International Preliminary Report on Patentability received for PCT Patent Application No. PCT/CN2015/073871, dated Sep. 21, 2017, 5 pages.

Ibrahim et al., "CellSense: An accurate energy-efficient GSM positioning system", IEEE Trans. Veh. Technol., vol. 61, No. 1, 2012, pp. 286-296.

Ferris et al., "Gaussian processes for signal strength-based location estimation", In Robotics: Science and Systems. The MIT Press, 2006, 8 pages.

(56) References Cited

OTHER PUBLICATIONS

Feeney et al., "Investigating the energy consumption of a wireless network interface in an ad hoc networking environment", in Proc. of the Twentieth Annual Joint Conference of the IEEE Computer and Communications Societies, Anchorage, USA, Apr. 2001, pp. 1548-1557.

European Search Report and Search Opinion Received for EP Application No. 15884210.4, dated Nov. 14, 2018, 9 pages.

European Search Report and Search Opinion Received for EP Application No. 15884208.8, dated Jan. 23, 2018, 15 pages.

Chon et al., "Sensing WiFi Packets in the Air: Practicality and Implications in Urban Mobility Monitoring", UBICOMP '14, Sep. 13-17, 2014, pp. 189-200.

Chen et al., "Practical metropolitan-scale positioning for GSM phones", In Proceedings of the 8th International Conference on Ubiquitous Computing (UbiComp), vol. 4206 of Lecture Notes in Computer Science, Springer, 2006, pp. 225-242.

Carroll et al., "An analysis of power consumption in a smartphone", in Proc. of USENIX ATC, 2010, 14 pages.

Agarwal et al., "Wireless Wakeups Revisited: Energy Management for VoIP over Wi-Fi Smartphones", in MobiSys'07, 2007, pp. 179-191.

3GPP TS 24.312, V12.11.0 "Access Network Discovery and Selection Function (ANDSF) Management Object (MO)" (Release 12), 2015, 377 pages.

Aaron Yi Ding et al, Enabling Energy-aware Collaborative Mobile Data Offloading for Smartphones, Apr. 18, 2013, 9 Pgs.

International Search Report, The International Search Report and the Written Opinion, dated Dec. 17, 2015, PCT/CN2015/073871, 12 Pgs.

International Searching Authority, The International Search Report and the Written Opinion, dated Dec. 11, 2015, PCT/CN2015/073874, 11 Pgs.

Kamol Kaemarungsi, Design of Indoor Positioning Systems Based on Location Fingerprinting Technique, Feb. 16, 2005; 193 Pgs.

Ozlem Bilgir Yetim et al, Dynamic Adaptive Techniques for Learning Application Delay Tolerance for Mobile Data Offloading, Jan. 12, 2015, 9 Pgs.

* cited by examiner

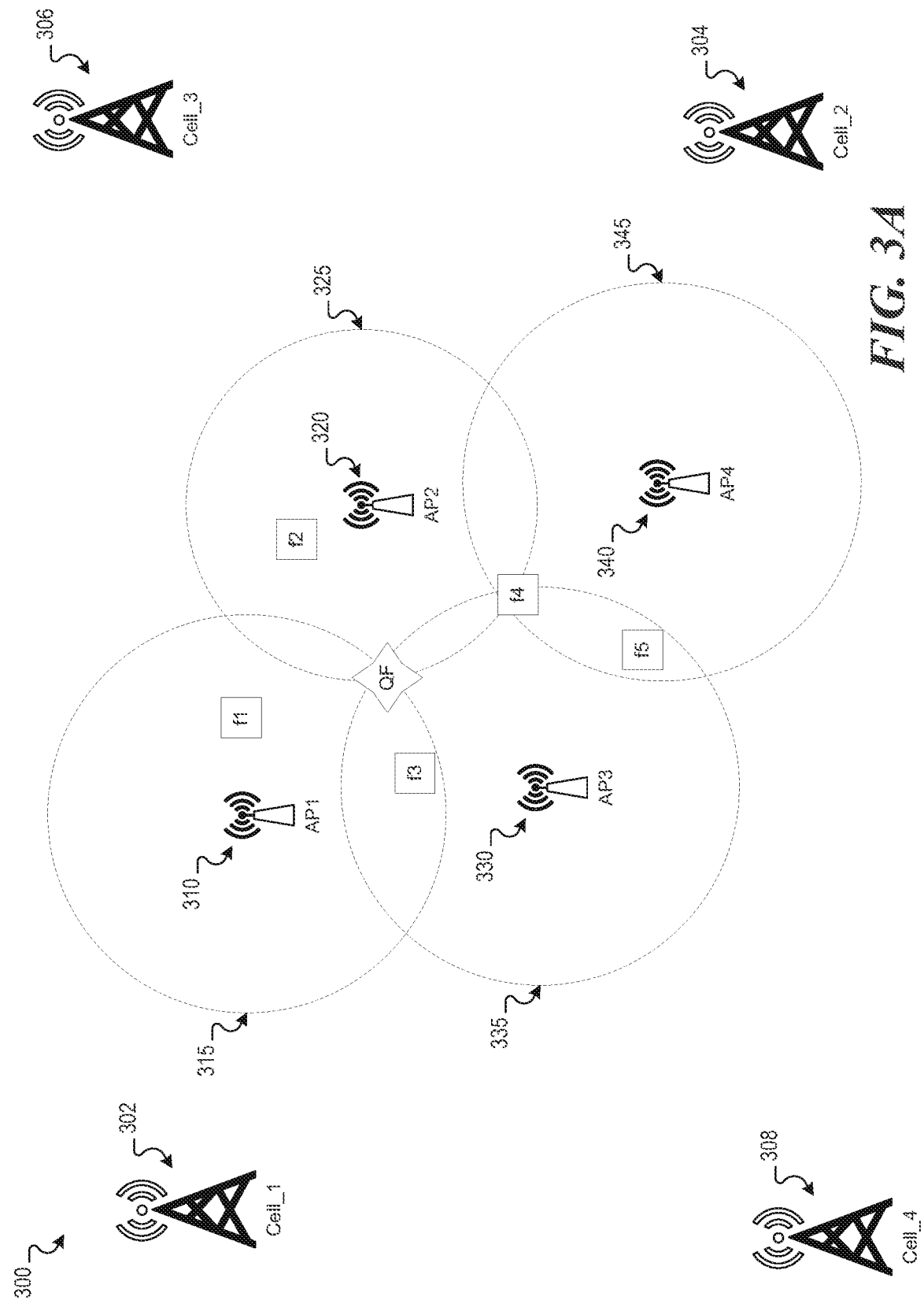

PREDICTING AVAILABLE ACCESS POINTS

CROSS-REFERENCE TO RELATED APPLICATIONS

This application is related to application Ser. No. 15/325,458 filed on Mar. 9, 2015, and titled "Predicting Access Point Availability," the entirety of which is incorporated herein by reference.

BACKGROUND

Cellular network communications devices, such as cellular phones and cellular network access points, transmit data across cellular networks. While bandwidth for transmitting data across cellular networks is limited, some cellular network communications devices are capable of transferring data across other networks, such as broadband or satellite networks.

BRIEF DESCRIPTION OF THE DRAWINGS

The following detailed description references the drawings, wherein:

FIG. 3A is an example illustration of fingerprint distribution.

DETAILED DESCRIPTION

Figure 1:
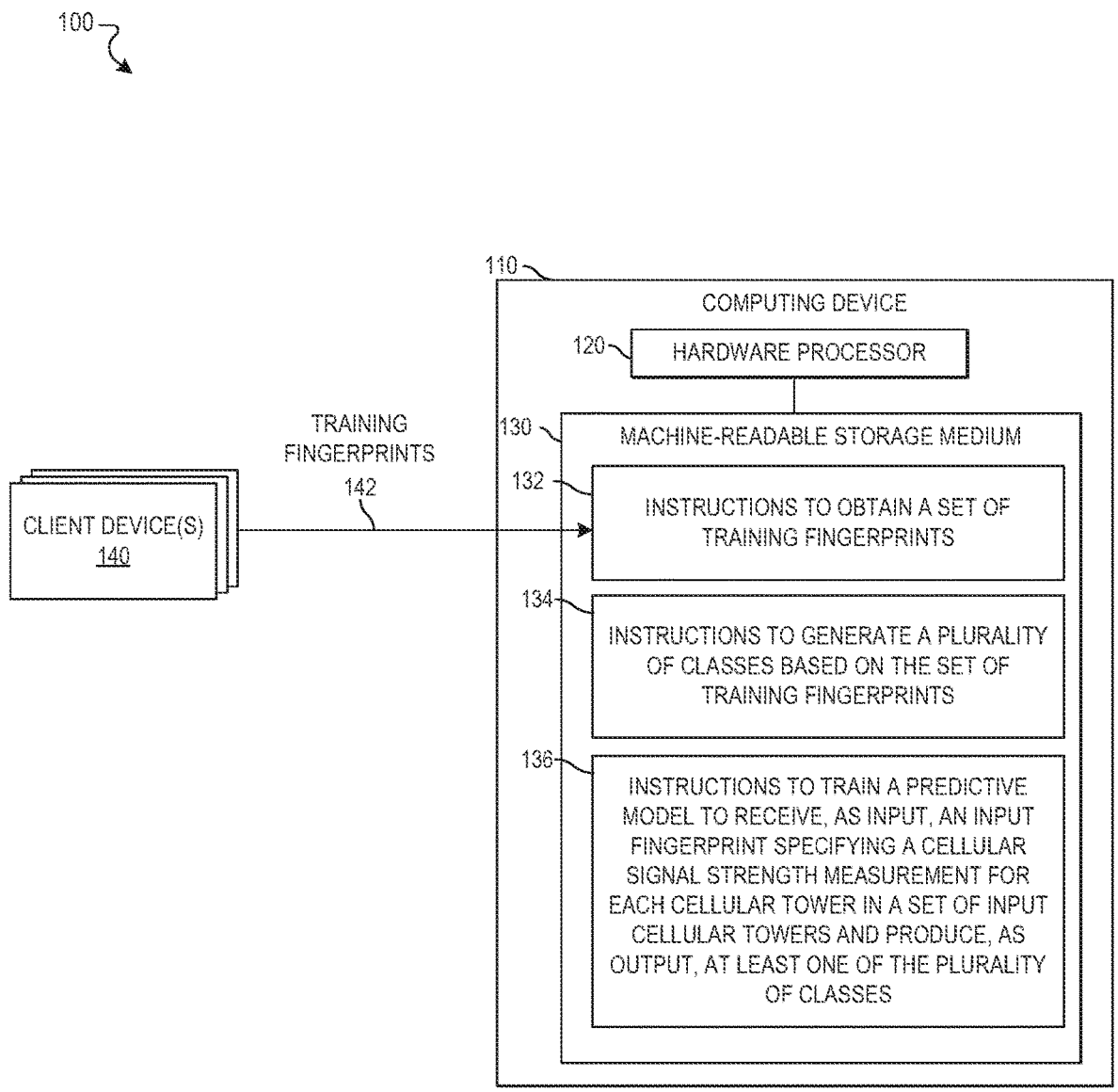
FIG. 1 is a block diagram of an example computing device for predicting available access points.

Cellular network communications devices, or cellular devices, may use mobile data offloading (MDO) techniques to avoid using cellular networks to transmit data. For example, a cell phone may connect to a broadband network using an included Wi-Fi radio in communication with a Wi-Fi access point, offloading the transmission of data to the broadband network. Offloading the transmission of data to a non-cellular network may have many advantages. For example, use of MDO may increase available cellular network bandwidth and, in some situations, increase the speed and/or reliability of data transmission for individual devices. For users who have network provider enforced limits on cellular data transmission, data offloading may allow those users' devices to transmit data across networks that do not contribute to the users' cellular data limit.

For some MDO methods, cellular devices use W-Fi radios to scan for and connect to available W-Fi access points that are connected to non-cellular networks. However, using a Wi-Fi radio requires power, and frequent use of a Wi-Fi radio to search for access points may drain a device's battery, and connecting or attempting to connect to an access point with relatively low signal strength may result in relatively slow data transmission and/or data loss, leading to a poor user experience. Predicting wireless access point availability allows a cellular network communications device to predict when a Wi-Fi access point may be within range of the device and, in some implementations, predict the quality, e.g., signal strength, of the access point. This allows the device to leave its Wi-Fi radio off until an access point is predicted to be within range, preserving the device's battery and increasing the likelihood of performing a successful handoff.

As used herein, "access point" refers to any access point to a network that is separate from the cellular network on which a cellular device is operating. For example, the access point may be a Wi-Fi router connected to a broadband or satellite network, or—in some implementations—a cellular hotspot connected to a cellular network that is separate from the cellular network on which the cellular device is operating. Cellular devices may communicate with access points in a variety of ways, including Wi-Fi, Wi-Fi Direct, and Bluetooth, to name a few.

By way of example, a wireless availability prediction device may predict available wireless access points by gathering cellular fingerprints from cellular devices. Cellular fingerprints include data specifying cellular signal strength, e.g., measured in decibel-milliwatts (dBm), for nearby cellular towers, or cells. The fingerprints also specify a set of nearby access points, e.g., access points that are within range of the cellular device at the time the fingerprint is created by the device. In some implementations, cellular fingerprints may be gathered after successful wireless handoffs, e.g., successful connections to Wi-Fi access points. For example, a cell phone may generate a wireless fingerprint at the time the cell phone connects to a Wi-Fi access point, and the fingerprint may specify the dBm of three nearby cells and two nearby access points at the time of the connection.

After gathering cellular fingerprints, the wireless availability prediction device creates classes for the fingerprints based on the access points specified by the fingerprints. In some implementations, a class may be created for each unique combination of access points specified by a fingerprint. Using the created class and the gathered fingerprints, the wireless availability prediction device may then train a predictive model, such as a single label classification model, to classify fingerprints. The predictive model may be trained to accept, as input, cellular signal strength measurements for a set of cell towers and produce, as output, a likely class to which the fingerprint belongs. Details regarding the training of the classification model are described in further detail below.

The trained classifier may be used on new fingerprints, e.g., fingerprints not included in the set of fingerprints used to train the classifier, to predict a classification for each new fingerprint. As each class specifies a set of access points, the classification of a new fingerprint may provide an indication of which access point(s) the device that produced the new fingerprint may be able to connect to. For example, in situations where the classifier produces output indicating that a fingerprint provided by a mobile device is likely to be in a class that include access points AP1 and AP2, the mobile device may, in response to receiving the output, enable a wireless radio and attempt to connect to AP1 and/or AP2. Further details regarding the use of a trained classifier for predicting wireless access point availability are discussed below.

Referring now to the drawings, FIG. 1 is a block diagram 100 of an example computing device 110 for predicting available access points. Computing device 110 may be, for example, a cellular device, such as a cell phone, a personal computer, a server computer, or any other similar electronic device capable of cellular communications or communicating with cellular devices. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-136, to control processes for predicting available access points. As an alternative or in addition to retrieving and executing instructions, hardware processor 120 may include one or more electronic circuits that include electronic components for performing the functionality of one or more instructions.

A machine-readable storage medium, such as 130, may be any electronic, magnetic, optical, or other physical storage device that contains or stores executable instructions. Thus, machine-readable storage medium 130 may be, for example, Random Access Memory (RAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with a series of executable instructions: 132-136, for predicting available access points.

As shown in FIG. 1, the computing device 110 obtains, from client device(s) 140, a set of training fingerprints 142 (132). Each training fingerprint specifies, for a client device, i) a set of access points, and ii) cellular signal strength measurements for each cellular tower in a set of cellular towers. For example, a cell phone may, in response to successfully connecting to an access point, create and provide to the computing device 110 a training fingerprint that includes i) a set of access points within range of the cell phone, and ii) signal strength measurements for each of three cells within range of the cell phone at the time it connected to the access point. The client device 140 may be any device in communication with the computing device 110, such as a cellular communications device, personal computer, server computer, or another device capable of sending data across cellular and Wi-Fi networks.

In some implementations, each training fingerprint further specifies, for the corresponding client device, an access point signal strength for the access points included in the set of access points. For example, in addition to specifying the dBm of each nearby cell, a fingerprint may also specify the dBm of each access point within range of the cell phone. In some implementations, each training fingerprint may also specify a registered cell tower to which the client device was registered. As described in further detail below, the registered cell may be used, for example, to determine which predictive model(s) to use when predicting available access points.

The computing device 110 generates multiple classes based on the set of training fingerprints (134). Each class specifies at least one access point, and the access points of each class correspond to the set of access points specified by at least one training fingerprint. Each class also specifies a different combination of access points. For example, one class may be created for all training fingerprints that specify access points AP1 and AP2 only, while another class may be created for all training fingerprints that specify access points AP1, AP2, and AP3 only. In this implementation, each training fingerprint belongs to exactly one class.

In implementations where each training fingerprint specifies access point signal strength measurements for the set of access points, each class may specify, for each access point of the class, an access point signal strength. The access point signal strength of each access point of each class corresponds to the access point signal strength measurement specified by at least one training fingerprint. Access point signal strength, in this situation, may be in dBm or another measurement, e.g., received signal normalized to levels, e.g., levels 1-5, 5 being the strongest signal strength range and 1 being the weakest signal strength range. By way of example, a first fingerprint may specify access points AP1 and AP2, and also a signal strength for each access point, e.g., AP1 strength of 5 and AP2 strength of 3, on a scale from 1-5. The first fingerprint may, in this situation, be classified as belonging to a class that includes AP1 (strength 5) and AP2 (strength 3). A second fingerprint that also specifies AP1 and AP2, but with different signal strength measurements, e.g., AP1 strength of 4 and AP2 strength of 5, may be in a class that is different from the first fingerprint. More granular classes, e.g., classes that specify AP signal strength in addition to the access points, may result in more granular classification results.

The computing device 110 trains a predictive model to receive, as input, an input fingerprint specifying a cellular signal strength measurement for each cellular tower in a set of input cellular towers and produce, as output, at least one of the classes (136). A number of training methods and/or classifiers may be used to train a predictive model. For example, single label classification methods, such as a support vector machine or C4.5 classification model, may be trained to produce the most likely class for a given input fingerprint. A C4.5 decision tree model may be trained, for example, which may be traversed using cellular signal strength measurements for decisions at each branch, with each leaf node ending in a particular class. Some classification methods, such as the C4.5 classification model may, in some implementations, be enhanced by additional processes. For example the RAkEL (Random-k Labelsets) method may be used to randomize classes and train multiple classification models, each classification model being trained using a different set of randomized classes. In this situation, an input fingerprint may be provided to each of the multiple trained classification models to produce multiple outputs, which may be combined—e.g., by averaging—to identify a most likely class for the input fingerprint Other methods for generating a trained predictive model, such as a support vector machine mentioned above, may also be used.

In some implementations, the predictive model is trained to produce, as output for each class, a measure of likelihood that the input fingerprint belongs to the class. For example, a trained C4.5 decision tree may indicate, for each leaf node that represents a class, a probability that a given input fingerprint would be classified as the class represented by the leaf node.

The trained predictive model may be used, e.g., by the computing device 110, to identify the mostly likely class for a given fingerprint, which may in turn be used to predict which access point(s) are likely to be available. For example, the predictive model may receive an input fingerprint generated by a cellular device, the input fingerprint specifying received signal strength (RSS) measurements from three nearby cell towers. The output provided by the trained predictive model may specify a class for the query fingerprint, e.g., a class that includes access points AP1 and AP2. In this example, the predicted available access points for the cellular device are AP1 and AP2.

In some implementations, the set of training fingerprints includes only training fingerprints received from a single client device 140. This allows predictive models to be trained for each client device. In some implementations, the set of training fingerprints includes training fingerprints received from multiple different client devices. This facilitates generation of crowd-sourced predictive models.

While the computing device 110 is shown separately from the client device(s) 140 in FIG. 1, in some implementations, some or all of the instructions 132-136 may be performed by a client device, alone or in combination with a separate computing device 110. For example, a client device may obtain training fingerprints and generate classes, and a server computer may use the generated classes and training fingerprints to train a predictive model. Further details regarding the training of the predictive model and prediction of access point availability are provided in the example described with respect to FIG. 2, below.

Figure 2:
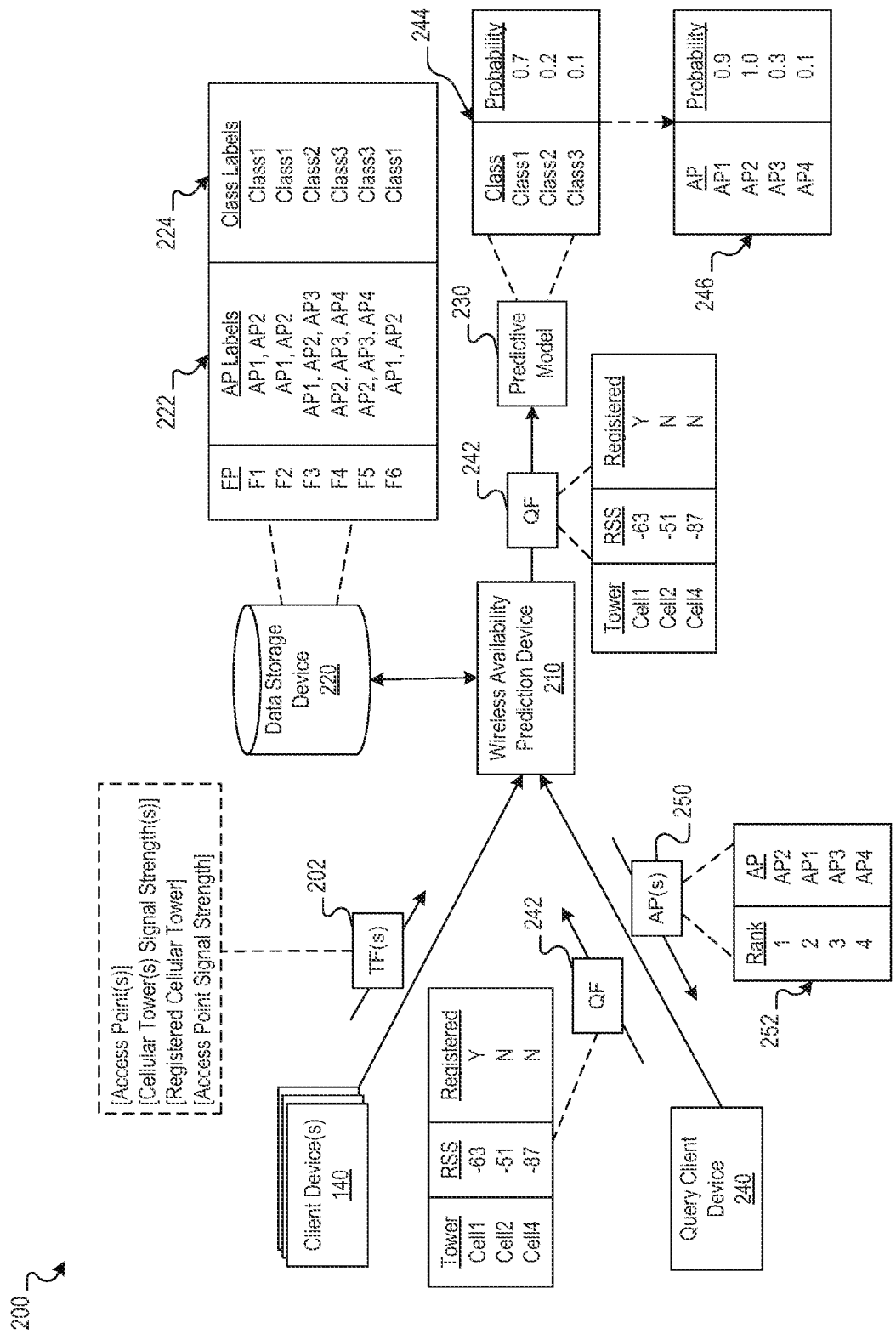
FIG. 2 is an example data flow for predicting available access points.

FIG. 2 is an example data flow 200 for predicting available access points. The example data flow 200 depicts the classification and modeling of training fingerprints 202 and also depicts predicting available access points using the trained predictive model. The data flow 200 depicts client devices(s) 140 and a query client device 230 in communication with a wireless availability prediction device 210. The wireless availability prediction device 210 is depicted separately from the client and query client devices, and is connected to a data storage device 220, such as a local hard drive. As noted above, in some implementations the wireless availability prediction device 210 may be included within a query client device 230, which may also be one of the client device(s) 140.

The client device(s) 140 provide training fingerprints 202 to the wireless availability prediction device 210. Each training fingerprint includes a set of access points and cellular signal strength measurements for each of a plurality of cellular towers. In some implementations, the training fingerprints 202 also specify a registered cellular tower and/or access point signal strength measurements for each of the access points specified by the fingerprint. An example set of training fingerprints 202 is provided in Table 1, below:

TABLE 1

| Fingerprint | Cell_1 | Cell_2 | Cell_3 | Cell_4 | AP1 | AP2 | AP3 | AP4 | Registered Cell |
|---|---|---|---|---|---|---|---|---|---|
| f1 | −61 | −81 | −63 | | −64 | −91 | | | Cell_1 |
| f2 | −63 | −81 | −63 | | −91 | −73 | | | Cell_1 |
| f3 | −63 | −75 | −71 | −85 | −82 | −91 | −82 | | Cell_1 |
| f4 | −71 | −69 | −75 | −83 | | −82 | −85 | −82 | Cell_1 |
| f5 | −71 | −69 | −75 | −75 | | −95 | −85 | −85 | Cell_1 |
| ... | ... | ... | ... | ... | ... | ... | ... | ... | ... |

The example training fingerprints shown in Table 1 are from devices that were all registered to Cell_1. In some implementations, fingerprints specifying different registered cells would be used to generate separate predictive models, e.g., models specific to each registered cell. To train the predictive model 230, the wireless availability prediction device 210 first transforms multi-label classification task to a single label classification task, e.g., transforms the multi-label classification task of classifying/labeling each fingerprint as one particular access point of multiple access points into a single label classification task of classifying a fingerprint as a class that represents multiple labels/access points. The transformation to a single-label classification task may be performed, for example, using a labeled powersets method, where each unique combination of access points specified by the training fingerprints is a separate class. In the example data flow 200, each set of access points specified by each training fingerprint is classified as belonging to one class. For example, access point labels 222, which specify the access points of each fingerprint, are assigned a class label 224. The transformation of the multi-label classification task, e.g., the process of creating classes based on the training fingerprints, is also shown in Table 2, below.

TABLE 2

| Fingerprint | Access Points (Labels) | AP Class |
|---|---|---|
| f1 | AP1, AP2 | Class 1 = {AP1, AP2} |
| f2 | AP1, AP2 | Class 1 = {AP1, AP2} |
| f3 | AP1, AP2, AP3 | Class 2 = {AP1, AP2, AP3} |
| f4 | AP2, AP3, AP4 | Class 3 = {AP2, AP3, AP4} |
| f5 | AP2, AP3, AP4 | Class 3 = {AP2, AP3, AP4} |
| ... | ... | ... |

As shown in the examples above, each new combination of access points specified by a fingerprint would result in the creation of a new class. In this example, each fingerprint belongs to only one class, and every class has at least one fingerprint belonging to the class.

After generating class labels 224 for the training fingerprints 202, the wireless availability prediction device 210 trains the predictive model 230. The predictive model 230 may be any predictive model capable of performing a single-label classification task, such as a support vector machine or C4.5 decision tree model. In the example data flow 200, the predictive model 230 is trained to receive fingerprint input that specifies cellular signal strength measurements and to produce, for at least one class, the probability that the fingerprint input belongs to that class.

In some implementations, for example, the wireless availability prediction device 210 may train multiple predictive models that each implement a respective decision tree and receive, as input, an input fingerprint and produce, as output, at least one class. Each predictive model may be trained using a different subset of classes generated using at least one pseudo-random subset of the access points specified by the set of training fingerprints. Implementing RAkEL, for example, in conjunction with the C4.5 decision tree model, results in multiple pseudo-randomly generated predictive models. In response to receiving an input fingerprint, the output of the multiple predictive models may be combined to identify at least one predicted access point for the input fingerprint. Using the output of one or more predictive models to predict a particular access point is described in further detail in the paragraphs that follow.

Trained predictive models, such as the example predictive model 230, may be stored in the data storage device 220. In situations where a predictive model is produced for each registered cell specified by training fingerprints 202, additional predictive models may also be stored in the data storage device 220.

To predict available access points using the trained model, the wireless availability prediction device 210 receives a query fingerprint 242 from a query client device 240. The query client device 240 may be, for example, a cellular device that is currently using a cellular tower for communications. In an attempt to offload the communications to a separate network via an access point, and without turning on Wi-Fi to check for nearby access points, the cellular device may send the query fingerprint 242 to the wireless availability prediction device 210 to determine if any nearby access points may be available. The cell towers and RSS measurements included in the query fingerprint 242 of the example data flow are reproduced in Table 3, below.

TABLE 3

| Cell Tower | RSS (dBm) | Registered |
|---|---|---|
| Cell_1 | −63 | Yes |
| Cell_2 | −51 | No |
| Cell_4 | −87 | No |

The data included in the query fingerprint 242 indicates that the query client device 240 was within range of and received signal strength measurements for three cell towers: Cell_1, Cell_2, and Cell_4. When the query fingerprint was generated, the query client device 240 was registered to Cell_1.

The wireless availability prediction device 210 classifies the query fingerprint 242 based on the cellular signal strength measurements specified by the query fingerprint 242. In the example data flow 200, the wireless availability prediction device 210 classifies the query fingerprint 242 by providing the query fingerprint 242 as input to the predictive model 230. The predictive model 230 provides, as output, candidate classes 244 and, for each candidate class, probability that the query fingerprint 242 belongs to the class.

In some implementations, the query fingerprint 242 may be classified as the class with the highest probability output by the predictive model 230. In the example data flow, Class 1 has the highest probability among the candidate classes 244, with a probability of 0.7. In some implementations, one or more access points are selected from the class to which the query fingerprint 242 belongs. For example, the wireless availability prediction device 210 may select AP1 and AP2—the two access points included in Class 1—and provide those access points to the query client device 240 as access points predicted to be available.

In some implementations, and as shown in the example data flow 200, the wireless availability prediction device 210 determines, for each access point specified in the candidate classes 244 output by the predictive model 230, a measure of likelihood that the query client device will successfully connect to the access point.

The likelihood that a device will successfully connect may not, in some implementations, be an actual probability of successful connection, e.g., due to environmental reasons and standard errors in model training, but may provide an indication of whether a successful connection to an access point is likely, e.g., relative to the likelihood of successfully connecting to another access point.

The example data flow 200 depicts probabilities 246 determined for each access point, AP1-AP4, which are the access points included in candidate classes Class1, Class2, and Class3. The probabilities 246, or measures of likelihood, may be determined in a variety of ways. For example, the wireless availability prediction device 210 may calculate, for each access point included in the candidate classes, the sum of each measure of likelihood received for each of the candidate classes 244 that contain the access point. Table 4, below, illustrates the summation of class probabilities for the access points AP1-AP4.

TABLE 4

| Class | P(Class) | AP1 | AP2 | AP3 | AP4 |
|---|---|---|---|---|---|
| Class1 | 0.7 | 1 | 1 | 0 | 0 |
| Class2 | 0.2 | 1 | 1 | 1 | 0 |
| Class3 | 0.1 | 0 | 1 | 1 | 1 |
| | SUM(P(Class)) | 0.9 | 1.0 | 0.3 | 0.1 |

Access point AP1, for example, is included in Class1 and Class2. Class1 has a probability of 0.7, while Class2 has a probability of 0.2. The sum of these is 0.9, which may be used as the measure of likelihood that the query client device 240 will successfully connect to access point AP1. Access point AP2 has a sum of 1.0, AP3 has a sum of 0.3, and AP4 has a sum of 0.1.

The probabilities 246 determined for each access point included in the candidate classes 244 are, in the example data flow 200, used to rank the access points for the query client device 240. For example, output from the wireless availability prediction device 210 specifies access points 250 and a list of ranked access points 252. Access points may, in some implementations, be ranked using other methods, e.g., access points may be ranked based on how often the access point appears in candidate classes.

The manner in which the wireless availability prediction device determines which access point(s) to provide in response to the query fingerprint 242 may vary. In some implementations, access points are only provided in response to a query fingerprint if their corresponding measure of likelihood exceeds a threshold. For example, with a sample threshold of 0.8, in the example data flow 200 only AP1 and AP2 would be provided to the query client device 240. In some implementations, only the access point with the highest measure of likelihood is provided, e.g., in the example data flow 200, only AP2 would be provided to the query client device 240.

Other methods, or combinations of methods, may also be used, such as providing the top N access points, where N is a positive integer, or providing the top N access points above a threshold measure of likelihood. In some implementations, the wireless availability prediction device 210 may not provide any access points in response to a query fingerprint, e.g., in situations where it is relatively unlikely that the querying client device will be able to successfully connect to an access point.

The access point(s) 250 provided by the wireless availability prediction device 210 may be used by the query client device 240 to determine whether to enable a wireless communications radio, such as the Wi-Fi radio on a cell phone, and attempt to connect to an access point. The output may also be used to determine which access point the query client device 240 attempts to connect to first. For example, in the example data flow 200, the query client device 240 may attempt to connect to access points in the ranked order provided in the output provided by the wireless availability prediction device 210. In some implementations, the client device may perform the operations described above related to determining which access points, if any, the client device will attempt to connect to. Illustrations provided in FIGS. 3A and 3B, described in further detail below, depict example situations in which a query client device may obtain a prediction for available access points.

Figure 3B:
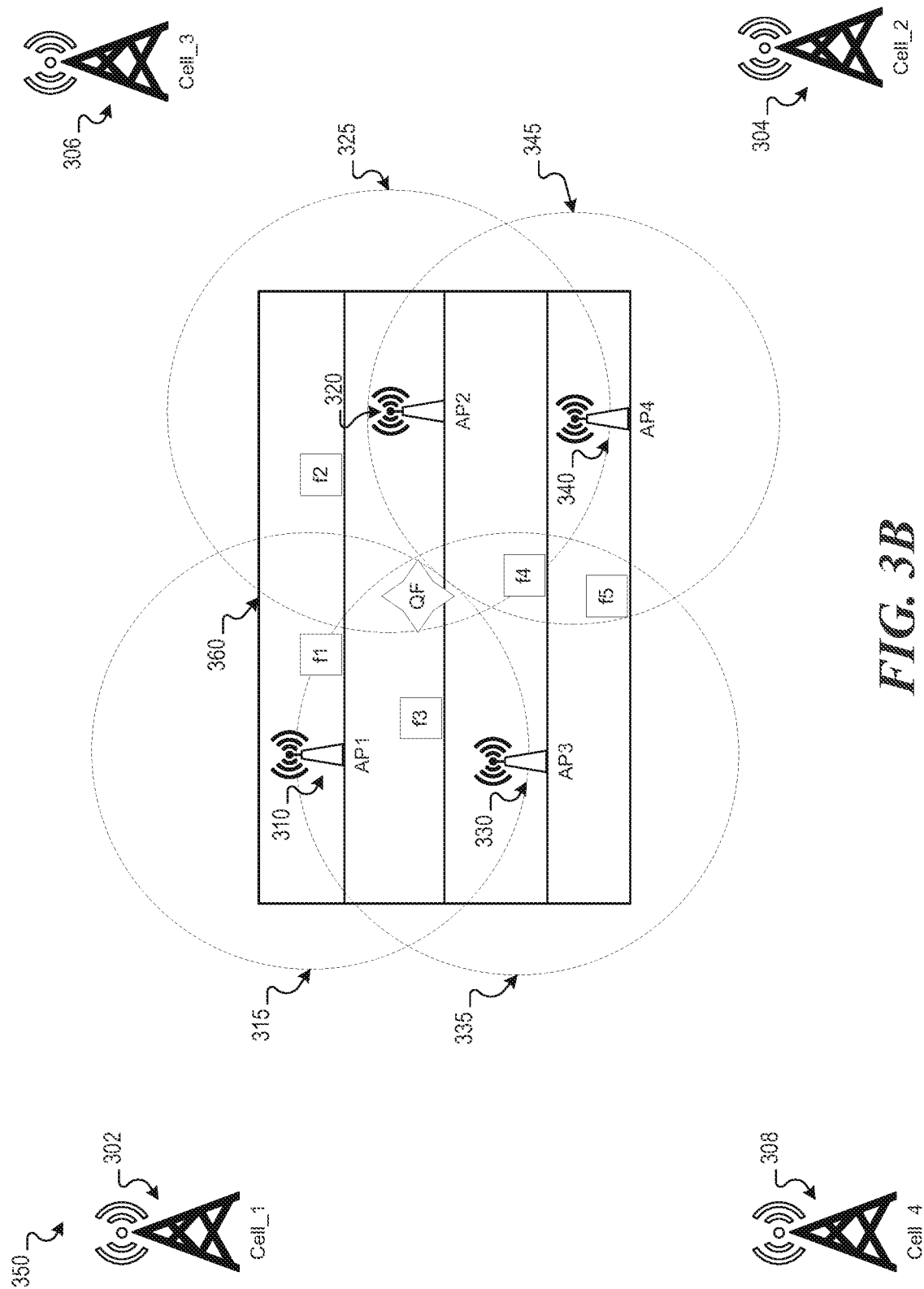
FIG. 3B is another example illustration of fingerprint distribution.

FIG. 3A is an example illustration 300 of fingerprint distribution, while FIG. 3B is another example illustration of fingerprint distribution. The illustrations 300 and 350 shown in FIGS. 3A and 3B depict an example physical distribution of the above example training fingerprints: f1-f5, as well as the example query fingerprint QF. FIGS. 3A and 3B both depict four cell towers, Cell_1 302, Cell_2 304, Cell_3 306, and Cell_4 308; four access points, AP1 310, AP2 320, AP3 330, and AP4 340; and a representation of the Wi-Fi range of each access points, e.g., circle 315 for AP1, 325 for AP2, 335 for AP3, and 345 for AP4. The illustration 350 of FIG. 3B also includes an example cross-section of a building 360 in which the access points are located. The illustrations 300 and 350 are different visual representations of the same fingerprints. Differences between the illustrations 300 and 350 are designed to indicate demonstrate that predicting access point availability in the manner described above may work in a variety of environments, both indoor and outdoor, and may be able to account for a variety of factors, including signal interference, geographic topology, and blocking structures, e.g., buildings and walls made of a variety of materials.

Figure 4:
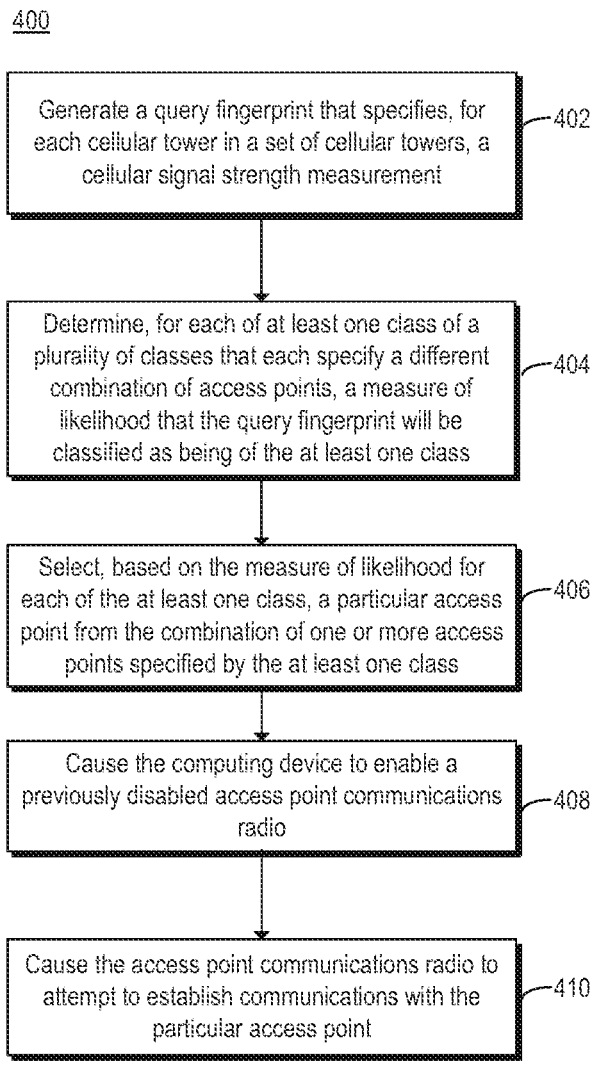
FIG. 4 is a flowchart of an example method for predicting available access points.

FIG. 4 is a flowchart of an example method 400 for predicting available access points. The method 400 may be performed by a computing device, such as a computing device described in FIG. 1, e.g., in the form of a cellular phone. Other computing devices may also be used to execute method 400. Method 400 may be implemented in the form of executable instructions stored on a machine-readable storage medium, such as the storage medium 130, and/or in the form of electronic circuitry.

A query fingerprint is generated that specifies, for each cellular tower in a set of cellular towers, a cellular signal strength measurement (402). For example, a cell phone may generate a query fingerprint by recording the signal strength of nearby cell towers. The query fingerprint may be generated, for example, periodically at set intervals, in response to user input, and/or in response to receiving a request for a query fingerprint, e.g., from a cellular network carrier.

For each of at least one classes that each specify a different combination of access points, a measure of likelihood that the query fingerprint will be classified as being of the class is determined (404). For example, the cellular signal strength measurements of the query fingerprint may be provided to a support vector machine that was trained to produce, as output, at least one access point class and a measure of likelihood that the query fingerprint belongs to each access point class. As described above, each access point class specifies a set of access points.

Based on the measure of likelihood for each class, a particular access point is selected from the combination of access points specified by the at least one classes (406). For example, five different classes may specify seven different access points, and a particular access point of those seven access points may be selected based on the measures of likelihood associated with each class that contains the particular access point.

In some implementations, a score or other measure may be generated for each access point specified by one of the classes, and each access point may be ranked based on its corresponding score, with the selection of the particular access point being based on the rank, e.g., selection of the highest ranked access point. The score may, in some implementations, be generated by calculating, for each access point, the sum of each measure of likelihood determined for each of the classes that contain the access point.

Scores and/or rankings may be calculated in a variety of other ways, and may take into account a variety of factors. For example, in implementations where classes specify access point signal strength levels for each access point, the access point level may affect its ranking, or score. E.g., a first access point having a measure of likelihood of successful connection of 0.9 may be ranked lower than a second access point having a measure of likelihood of successful connection of 0.85 if the first access point has a lower predicted signal strength level than the second access point.

Access points may be ranked using any combination of the above methods and may also be ranked using additional methods. For example, user and/or carrier preferences may result on one access point being ranked higher than another access point, and access point bandwidth congestion—if known or estimated—may also be used to rank access points.

The computing device enables a previously disabled access point communications radio (308). The computing device may, for example, enable a Wi-Fi radio in response to determining that a Wi-Fi access point is predicted to be within range. E.g., a cell phone may enable the Wi-Fi radio in response to determining that a ranking score and/or measure of likelihood of successful connection for a particular access point meets a threshold ranking score.

The computing device causes the access point communications radio to attempt to establish communications with the selected access point (310). For example, a cell phone may cause the included Wi-Fi communications radio to attempt to connect to the highest ranking access point. In some implementations, if the highest ranking access point is unavailable, or attempted connection fails, the cell phone may attempt to connect to the second highest ranking access point.

In some implementations, an access point signal strength for each of one or more access points is obtained. For example, after activating a Wi-Fi radio and successfully connecting to an access point, the cell phone may measure signal strength to the connected access point as well as other access points within range. The cell phone may then generate a training fingerprint that specifies the access point signal strength measurements as well as cellular signal strength measurements, e.g., the measurements provided to the predictive model. The training fingerprint may then be provided to a prediction device, such as a third party server device, where it may be used to retrain the predictive model.

While the method 400 is described with respect to a cellular device, other computing devices may also be used for some or all of the steps. For example, a server computer may determine measures of likelihood with respect to classes, select one or more access points from one or more classes, and provide the cellular device with a ranked list of access points to choose from.

The foregoing disclosure describes a number of example implementations for predicting available access points. As detailed above, examples provide a mechanism for identifying access points that are likely to be good candidates for MDO handoffs.

We claim:

1. A computing device for predicting available access points, the computing device comprising:
   a hardware processor; and
   a data storage device storing instructions that, when executed by the hardware processor, cause the hardware processor to:
   obtain a set of training fingerprints, each training fingerprint specifying, for a client device, i) a set of access points, and ii) cellular signal strength measurements for each cellular tower in a set of cellular towers;

generate a plurality of classes based on the set of training fingerprints, each class specifying at least one access point, the at least one access point of each class corresponding to the set of access points specified by at least one training fingerprint, and each class specifying a different combination of access points; and train a predictive model to receive, as input, an input fingerprint specifying a cellular signal strength measurement for each cellular tower in a set of input cellular towers, wherein the predictive model implements a decision tree that, when provided with data representing the input fingerprint, provides output specifying one of the plurality of classes and produce, as output, at least an indication, for each leaf node that represents a class, a probability that a given input fingerprint would be classified as the class represented by the leaf node;

train a plurality of different predictive models that each implement a respective decision tree and receive, as input, the input fingerprint and produce, as output, at least one of the plurality of classes, each different predictive model being trained based on a different plurality of classes generated using at least one pseudo-random subset of the access points specified by the set of training fingerprints; and responsive to receiving the input fingerprint combine output from the predictive model and the plurality of different predictive models to identify at least one predicted access point for the input fingerprint.

2. The computing device of claim 1, wherein the predictive model is trained to produce, as output for each class in the at least one of the plurality of classes, a measure of likelihood that the input fingerprint belongs to the class.

3. The computing device of claim 1, wherein each training fingerprint further specifies, for a client device, access point signal strength measurements for each access point in the set of access points specified for the client device, and wherein each class specifies, for each access point of the class, an access point signal strength, the access point signal strength of each access point of each class corresponding to the access point signal strength measurement specified by at least one training fingerprint.

4. A method for predicting available access points, implemented by a hardware processor, the method comprising:
receiving, from a client device, a query fingerprint that specifies, for each cellular tower included in a set of cellular towers, a cellular signal strength measurement;
classifying, using a predictive model, the query fingerprint as one of a plurality of classes based on the cellular signal strength measurements specified by the query fingerprint, each of the plurality of classes specifying a combination of one or more access points, each combination being different from combinations specified by each other class in the plurality of classes, wherein the predictive model implements a decision tree that, when provided with data representing the input fingerprint, provides output specifying one of the plurality of classes and produce, as output, at least an indication, for each leaf node that represents a class, a probability that a given input fingerprint would be classified as the class represented by the leaf node;

selecting at least one access point from the combination of one or more access points specified by the classified class;
generating, for each selected access point, a measure of likelihood that the client device will successfully connect to the selected access point;
ranking each selected access point based on the measure of likelihood generated for the selected access point, wherein the data specifying the at least one access point specifies the selected access point with the highest ranking relative to the rankings of other selected access points; and
providing the client device with data specifying the at least one access point.

5. The method of claim 4, wherein:
classifying the query fingerprint as one of a plurality of classes comprises:
providing the query fingerprint as input to a support vector machine that was trained using a plurality of training fingerprints;
receiving, as output from the support vector machine, a plurality of candidate classes and, for each candidate class, a measure of likelihood that the query fingerprint belongs to the class; and
classifying, using a predictive model, the query fingerprint as being of a particular candidate class of the plurality of candidate classes, the particular candidate class having a highest measure of likelihood relative to other measures of likelihood for other candidate classes of the plurality of candidate classes, wherein the predictive model implements a decision tree that, when provided with data representing the input fingerprint, provides output specifying one of the plurality of classes and produce, as output, at least an indication, for each leaf node that represents a class, a probability that a given input fingerprint would be classified as the class represented by the leaf node; and
selecting at least one access point from the combination of one or more access points specified by the classified class comprises:
calculating, for each access point included in the particular candidate class, the sum of each measure of likelihood received for each of the candidate classes that contain the access point; and
selecting, as the at least one access point, the access point having a highest sum relative to the sum of each other access point included in the particular candidate class.

6. A non-transitory machine-readable storage medium encoded with instructions executable by a hardware processor of a computing device for predicting available access points, the machine-readable storage medium comprising instructions to cause the hardware processor to:
generate a query fingerprint that specifies, for each cellular tower in a set of cellular towers, a cellular signal strength measurement;
determine, for each of at least one class of a plurality of classes that each specify a different combination of access points, a measure of likelihood that the query fingerprint will be classified as being of the at least one class;
determine, for each access point specified by the at least one class, a score for the access point;
rank each access point specified by the at least one class based on the score for the access point, and wherein the selection of the particular access point is based on the rank of the particular access point;

select, based on the rank of a particular access point, the particular access point from the combination of one or more access points specified by the at least one class;

cause the computing device to enable a previously disabled access point communications radio; and cause the access point communications radio to attempt to establish communications with the particular access point.

7. The storage medium of claim 6, wherein the score generated for each access point is generated by calculating, for each access point, the sum of each measure of likelihood determined for each of the at least one class that contains the access point.

8. The storage medium of claim 6, wherein the measure of likelihood that the query fingerprint will be classified as being of the at least one class is determined by:

providing the query fingerprint as input to a trained classification model that was trained using a plurality of training fingerprints to receive, as input, cellular signal strength measurements and provide, as output, a measure of likelihood, for each of the at least one class, that the query fingerprint will be classified as being of the class.

9. The storage medium of claim 6, wherein the instructions further cause the hardware processor to:

obtain, for each of a plurality of access points, an access point signal strength measurement;

generate a training fingerprint that specifies i) for each cellular tower in the set of cellular towers, the cellular signal strength measurement, and ii) the access point signal strength measurement for each of the plurality of access points; and provide the training fingerprint to a third party computing device.

* * * * *